June 3, 1958 K. ALTMANN 2,836,853
MOLD FOR THE MANUFACTURE OF ARTIFICIAL
THERMOPLASTIC BEARING CAGES FOR
ANTI-FRICTION BEARINGS
Filed March 29, 1954 2 Sheets-Sheet 1

Inventor
KURT ALTMANN
By Shoemaker & Mattare
Attorneys

United States Patent Office 2,836,853
Patented June 3, 1958

2,836,853

MOLD FOR THE MANUFACTURE OF ARTIFICIAL THERMOPLASTIC BEARING CAGES FOR ANTI-FRICTION BEARINGS

Kurt Altmann, Herford, Westphalia, Germany, assignor to Durkoppwerke Aktiengesellschaft, Bielefeld, Germany, a corporation of Germany Application March 29, 1954, Serial No. 419,546

Claims priority, application Germany April 2, 1953

3 Claims. (Cl. 18—34)

Cages for the guiding and holding of the rolling elements of anti-friction bearings such as roller bearings, needle bearings and ball bearings have up till now been made mainly from steel or other metal. For merely guiding cages that is, without retaining of the roller members, it has already been proposed to make the cages of artificial material and it has also already been proposed to make cages for the guiding and holding of the roller members with a plurality of parts made of artificial material and to join subsequently the individual cage parts. The manufacture of roller bearing cages in one piece of thermoplastic masses entails great difficulties due to the necessary complicated die casting moulds.

It is a necessary requirement for the cages to form the cage pockets for receiving the rollers so that these latter are guided on all sides and secured against falling out. This requirement results in a very expensive and troublesome die casting mould as, besides the necessary slide construction there must be provisions for obtaining an undercutting of the pocket walls in the direction of draw.

According to experience with the use of mould tools working with slides, thin ridges form between the parts of the die casting mould subject to wear, which ridges must be removed from the finished die cast moulded part in order to ensure faultless operation of the cage and the bearings equipped with the cage. In operation the ridges, if not previously removed are worn off and cause disturbances of various kinds.

In the preparation of the cages in die casting moulds working with slides it is practically impossible to use multi-cast mould tools for the simultaneous manufacture of several die cast moulded parts. The manufacturing costs with the use of simply cast moulds are of course considerably higher than is the case with die cast moulded parts. There is as already mentioned still the possibility of forming the cages more favourably from the die cast moulding technical point of view in that they are formed in several parts and are joined subsequently. In several parts, in the sense of the foregoing examples, means that, for example, a lateral ring of the cage is made separately and is fixed subsequently in any manner to the other cage part consisting of the second lateral ring and the cross pieces. In this case, however, care must be taken for a faultless connection of the cage parts which is scarcely possible with small cross sections without adversely affecting the rigidity and precision of the cage.

By means of the present inventon an absolutely ridge-free and faultless die cast cage for the guiding and holding of the rolling members can be made, and in addition the manufacturing costs are considerably reduced by the possibility of the use of multi-cast moulds for the simultaneous manufacture of several cages in one working process.

In order to attain the objective aimed at it is proposed, according to the invention, to use for the manufatcure of a cage suitable for the guiding and holding of the rolling members, a die casting mould formed in several parts which mould consists of a middle part of the mould producing step-like cage cross pieces which embrace the rolling members at their outer surfaces for the guiding and holding of them and consist of an upper and a lower part for the formation of the rail-like rings or strips axially bounding the rolling members connecting the cage cross pieces. The cage is die cast moulded in one piece after the bringing together of the part moulds in the die casting mould so formed.

The formation of the middle part of the mould is of special significance which according to the invention is formed by a pre-form having the cage cross pieces as hollow spaces, which is removed subsequently by mechanical or chemical destruction from the one piece cage.

Another form of the middle part of the mould according to the invention consists of a flexible metal strip with rolling member mould parts fixed thereon forming the cage pockets. The flexible metal strip is, on putting together of the die casting mould, placed around a piston forming the inner wall of the middle mould or in a hollow cylinder forming the outer wall of the middle mould whereby the flexible metal strip acts for the time as the other wall of the middle mould and is removed from the one part cage after injection of the mould.

The die casting mould and the manufacturing process is described in detail in what follows with reference to the attached drawings. In the drawings.

Figure 1:
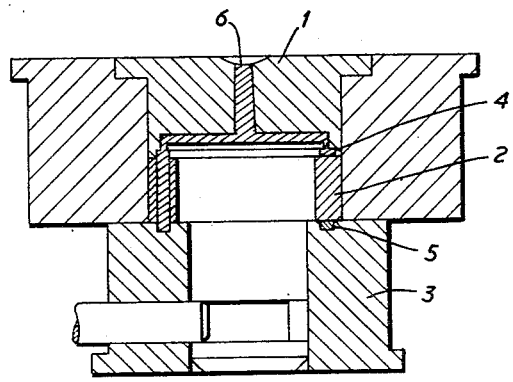
Fig. 1 is a cross section through a die casting mould as used for the manufacture of a cylindrical roller cage.

The die casting mould shown in Fig. 1 represents an example for the manufacture of a cylindrical needle roller cage. For large numbers of pieces of course the usual multiple moulds used in the manufacture of small parts in die casting mould technology, can be used without difficulties. The actual mould tool is formed in three parts and consists of the upper part of the mould 1 provided with filling channels, the middle part of the mould 2 and the lower part of the mould 3. The remaining parts of the die casting mould are of normal construction and are of no significance as regards the present invention and therefore their representation and description may be omitted.

Figure 5:
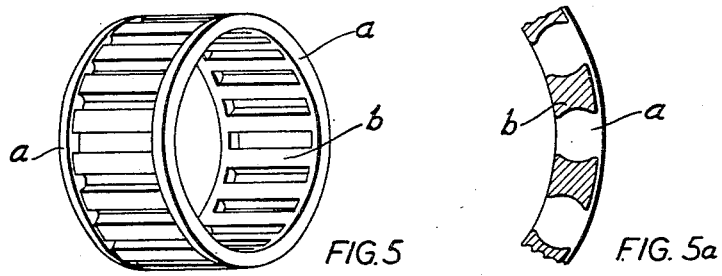
Figs. 5 to 7 show some examples of roller bearing cage moulds as they can be made according to the invention.

The upper part of the mould 1 and the lower part 2 have groove-like hollow spaces 4 and 5 respectively in which are formed the lateral rings $a$ of the needle roller cage illustrated in Fig. 5 axially bounding the roller members and connecting the cage cross-pieces. In the middle part of the mould 2 the step-like cage cross-pieces $b$ are produced which cross pieces, for the necessary holding of the rollers have opposed concave surfaces so that the slots or pockets bounded by the cross-piece walls are narrower at the outer and inner circumferences of the cage than in the middle zones lying between those circumferences.

Figure 2:
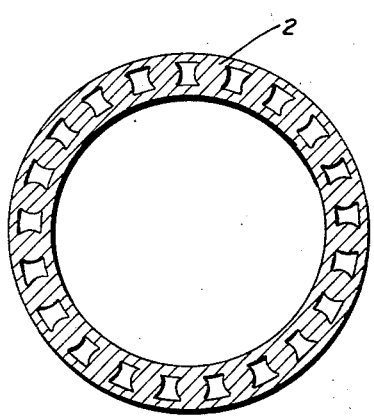
Fig. 2 is a pre-mould for cylindrical roller cage in transverse section.
Figure 3:
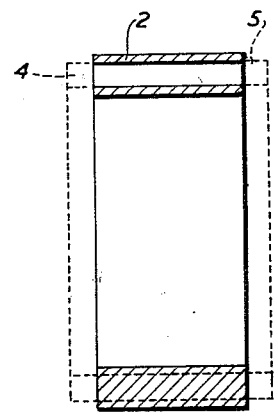
Fig. 3 is a longitudinal cross section.

As now the middle part of the mould 2 cannot be removed axially, because of the lateral rings $a$ connecting the cross pieces $b$, as would be necessary with regard to the cross piece cross section, a pre-form or core in the form of a ring is used for this part of the mould 2 in which the cage cross pieces are received as hollow spaces that are of a negative form. As a material for the pre-form illustrated in Figs. 2 and 3, a sufficiently mass retaining and heat resistant artificial material is selected. This preform is then built in as a middle part of the mould 2 in the finished die casting mould and its hollow spaces as also the hollow spaces 4 and 5 in the upper 1 and lower parts of the mould 2 are filled with die casting mould mass which is injected through the filling channel 6 in the upper part of the mould 1.

After this casting process the outer and inner portions of the pre-forms 2 embracing the cage cross pieces b is removed as by turning and boring until the portions remaining between the cage cross pieces b can be removed by pushing out.

The pre-form may however also be released chemically by means of a solvent. In this case care must be taken that different kinds of artificial materials are used for the pre-form 2 and for the cage being moulded. Polystyrol which dissolves very well in benzene is suggested, for example, for the pre-form and polyamide which is absolutely resistant against benzene, for the cage. The chemical process has the advantage that in mass production the labour costs remain very low.

As the injection of the cages with the aid of the precast rings can be effected without difficulties in multiple moulds there is considerable saving in manufacture. Polyamide or polyurethane are mainly considered as suitable materials for the finished product but the process is not limited to the use of these materials.

Figure 4:
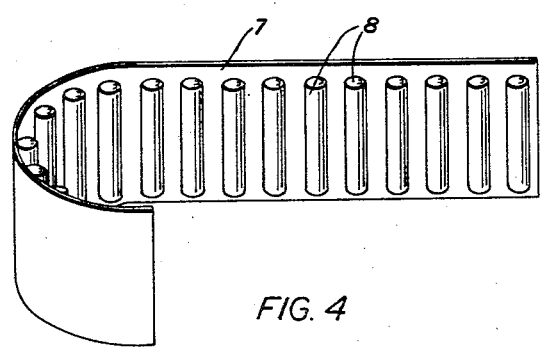
Fig. 4 shows in perspective another example of the middle part mould of the die casting mould for the manufacture of a roller cage.

According to a further example of the invention a flexible metal strip 7 (Fig. 4) with roller-like members 8 thereon is used to produce the cage pockets fixed thereon, this constituting the middle part 2 of the mould. This flexible metal strip 7, on the putting together of the die casting mould is placed around a piston forming the middle mould part or placed in a hollow cylinder forming the outer wall of the middle mould part. The flexible metal strip 7 thus forms, for the time, the other wall of the middle mould part and the roller-like member 8 fixed on it enclose between themselves and the said walls hollow spaces corresponding to the cross sectional form of the cage cross pieces b. The upper part of the mould 1 and the lower part 3 have the same shape as in the first described example.

After injection into the mould of the artificial material the upper mould part 1 and the lower part of the mould 3 are drawn off axially and the metal strip 7 with the roller-like member 8 fixed thereon forming the middle mould 2 is wound off radially. This process is however only applicable if the artificial material used for making the cage is so elastic that the roller-like member 8 of the flexible metal strip 7 embedded between the cross pieces can be withdrawn from the cage pockets on winding off of the metal strip 7, without damaging the cage. With the artificial materials polyamide and polyurethane this is possible without further effort. Compared with the first example in which the middle mould part 2 is wasted after one use, the part 2 in this example can be used again as often as required which, particularly with large numbers of pieces, means a reduction in the cost.

The molding apparatus according to the invention is applicable for roller bearing cages of all kinds and is not limited to any particular roller member moulds or cage moulds. Of particular interest is the field of needle bearings, since the small and extra small roller diameters used therein, render the making of metal cages extremely difficult. The advantages of cages of artificial material is of course the good running properties of many such materials and a further very essential advantage is the noise dampening qualities of these materials. Likewise due to the mold construction the width of the cross piece cross section of the cage may be formed of considerably narrower width than is possible with the metal or artificial cages made in other molds. Thus with a given bearing diameter a larger number of roller members can be used and thus the supporting capacity of the bearing is increased. By means of the molding apparatus there is practically no lower limit for the width of the cross piece cross section so that these in particular can be selected smaller than the radial height of the cross section of the cross pieces.

Figure 5A:
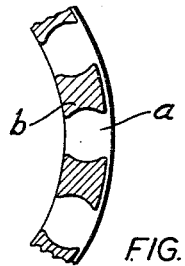
Figure 6:
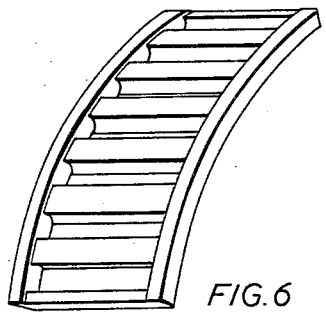
Figure 7:
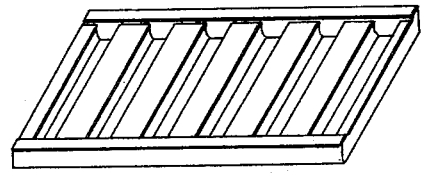

In Figs. 5 to 7 some examples of roller bearing cages made in accordance with the invention, are shown. Fig. 5 shows a one-piece cylindrical needle roller cage with individual pockets for the guiding and holding of the needle rollers. The cage cross pieces b have the cross section shape shown in Fig. 5a and the needle rollers are sprung, in known manner, from the outside or inside, into the cage pockets which is possible without further trouble in consequence of the elasticity of the artificial material. The cage cross pieces b connected by the lateral rings a may have a smaller radial height than the lateral rings themselves so that between the individual roller members supply chambers for receiving grease are formed.

Fig. 6 shows a roller cage segment for larger bearing diameters and Fig. 7 shows a roller slot cage for flat bearings. The manufacture of these cages is effected in the same manner as with the cylinder needle roller cage described.

What I claim is:

1. In a mould for forming a plastic cage for needle bearings, a first mould section having one surface provided with an annular groove therein, a second mould section having a surface provided with an annular groove, the grooved surfaces of said first and second mould sections being disposed in opposed relation, a destructible mould member disposed between said first and second mould sections and having its opposite ends engaged thereby, said destructible mould member having a series of annularly arranged, circumferentially spaced, parallel cavities therein with said cavities extending axially of said destructible mould member and opening upon the opposite ends thereof, the opposite sides of each cavity being concave, means for locating said destructible mould member between said first and second mould sections such that the opposite ends of said cavities communicate and register with said annular grooves, and one of said mould sections having a sprue passageway therein communicating with the corresponding annular groove therein.

2. The mould as defined in claim 1 wherein said means for locating the destructible mould comprises an outer mould section embracing said destructible mould member and at least a portion of one of said mould sections.

3. The mould according to claim 1 wherein said destructible mould comprises inner and outer cylindrical and concentric wall portions and there being a series of circumferentially spaced solid cylindrical roller-like elements secured between said wall portions and defining, in the spaces therebetween, said cavities.

References Cited in the file of this patent

UNITED STATES PATENTS

| | | |
|---|---|---|
| 865,314 | Osborn | Sept. 3, 1907 |
| 2,017,216 | Marcus | Oct. 15, 1935 |
| 2,343,205 | Pudelko | Feb. 29, 1944 |
| 2,526,634 | Chavannes | Oct. 24, 1950 |